United States Patent [19]

Pinfold et al.

[11] 4,154,999
[45] May 15, 1979

[54] METHOD OF ARC WELDING

[75] Inventors: Brian E. Pinfold, Bedford; John H. Nixon, Cranfield, both of England

[73] Assignee: BOC Limited, London, England

[21] Appl. No.: 774,977

[22] Filed: Mar. 7, 1977

[30] Foreign Application Priority Data

Mar. 8, 1976 [GB] United Kingdom ............... 9245/76

[51] Int. Cl.² .............................................. B23K 9/16
[52] U.S. Cl. ...................................... 219/72; 219/74; 219/137.41
[58] Field of Search ................... 219/72, 74, 146, 137, 219/137.41; 61/69 R

[56] References Cited

U.S. PATENT DOCUMENTS

| Re. 26,549 | 3/1969 | Cary | 219/146 X |
|---|---|---|---|
| 2,281,070 | 4/1942 | Jennings | 219/137 WM |
| 3,527,916 | 9/1970 | Ebert | 219/74 |
| 3,794,804 | 2/1974 | Berghof | 219/74 X |
| 3,837,171 | 9/1974 | Scurlock | 61/69 R |
| 3,843,867 | 10/1974 | Helton | 219/146 |
| 3,876,852 | 4/1975 | Topham | 219/74 X |

OTHER PUBLICATIONS

Kollman "Solving Problem of GMAW Fume Extraction".

Primary Examiner—E. A. Goldberg
Attorney, Agent, or Firm—Dennison, Dennison, Meserole & Pollack

[57] ABSTRACT

In underwater arc welding in a chamber filled with gas a consumable flux cored arc welding wire is fed to a welding torch and an arc is struck between the wire and the work to be welded so as to effect transfer of weld metal from the wire to the work. The arc welding wire contains at least one strong deoxidizer selected from the group consisting of magnesium, aluminium, zirconium, titanium, barium, lithium and calcium. A shielding gas is fed to the torch and emerges therefrom as an annular curtain of gas which shields the arc. The shielding gas also helps stabilize the arc from the effects of underwater pressure. The shielding gas comprises at least one oxygen-containing gas selected from oxygen and carbon dioxide.

14 Claims, 1 Drawing Figure

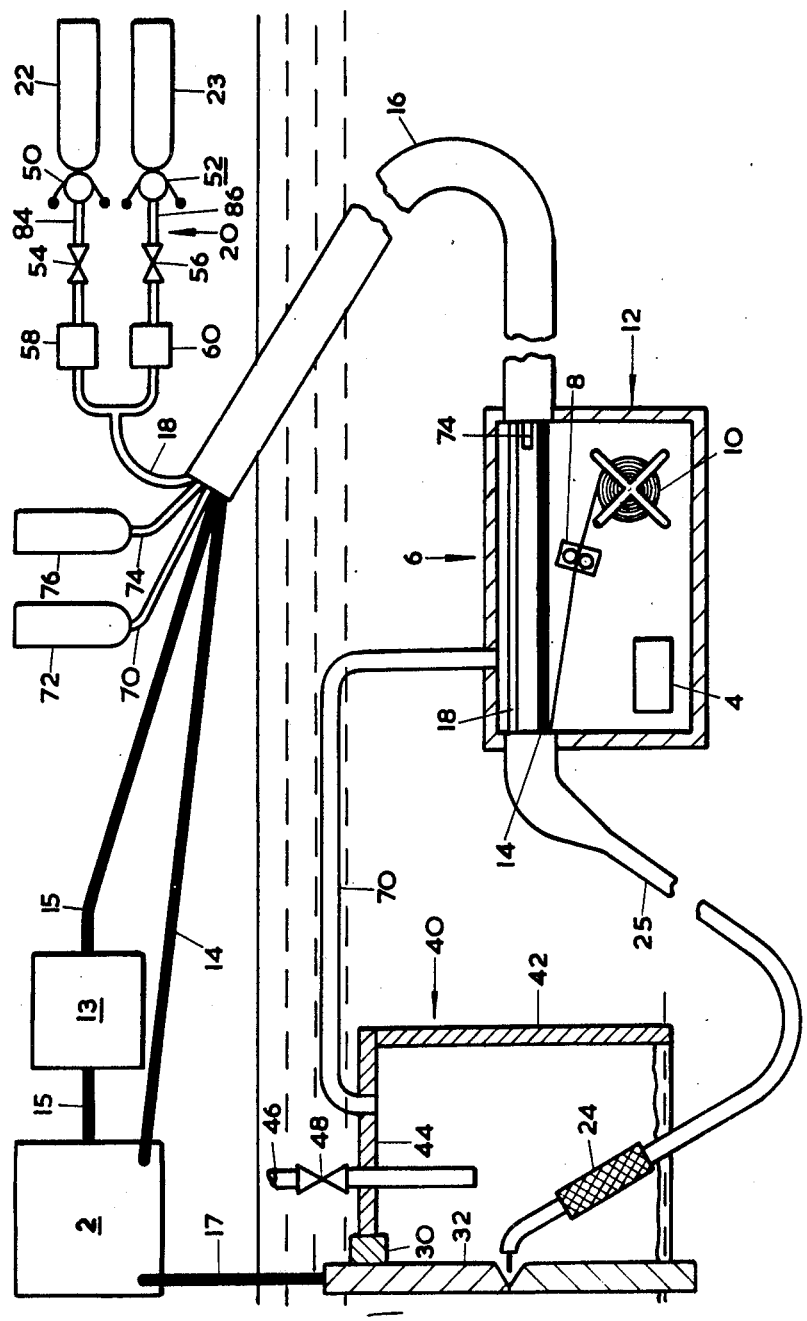

METHOD OF ARC WELDING

BACKGROUND OF THE INVENTION (a) Field of the Disclosure

This invention relates to a method of arc welding in a chamber in which there is a gaseous environment at superatmospheric pressure. The method is particularly intended for operation under water.

(b) Description of the Prior Art

With the growth of the offshore industry it has become essential to be able to make welds under water to a standard that satisfies certain nationally and internationally recognised welding codes.

Attempts have been made to weld under water without taking any steps to protect the welding arc from water. These have been unsuccessful, partly because water entering the arc becomes dissociated and the hydrogen thus formed is dissolved in the weld pool. The rapid quenching effect of the water on the weldments creates hard martensitic structures in the heat affected zone (HAZ) which are susceptible to hydrogen induced cracking, owing to hydrogen diffusion into the heat affected zone, particularly in joints subject to restraint.

It has been proposed to prevent water entering the arc by using a welding torch with a nozzle which is adapted to form a protective annular curtain of water spaced apart from the welding arc. With this piece of equipment it has been proposed to use a semi-automatic welding method with a consumable welding wire and a shielding gas including a large proportion of argon or carbon dioxide. This method is described inter alia in the Journal of the Japan Welding Society, 1974, pp 23 to 30, and pp 141 to 146.

However, when it is required to vary the angle of the welding torch in relation to the work, (i.e. in "out-of-position" welding) as in manually operated GMA welding, the water curtain shielding cannot be fully maintained to prevent relatively large quantities of water from entering the arc, and the resultant turbulence seriously impairs the welder's visibility. Even when a constant angle is maintained so as to preserve the water curtain (e.g. in automatic straight line welding) fume emitted by the consumable welding wire will tend to be confined to the region of the arc by the water curtain thereby also seriously impairing the welder's visibility of the arc. Alternatively, it has been proposed to use 'in the wet' a flux cored wire or a solid wire with a shielding gas under water, without any water curtain. The use of solid wire with a shielding gas is the conventional so-called GMA welding process. Such proposals have been made in a number of papers, for example, by M. L. Levin in Marine Technology, Vol. 4, No 3, June 1973, pp 73 to 77, and by I. M. Savitch in the proceedings, International Conference, Welding in Offshore Constructions, 26 to 28 February 1974, paper No. 20, pp 217 to 220. In the latter case no western Investigator has been able to repeat the claimed results.

Satisfactory welds may be achieved under water using semi-automatic GMAW by forming under water a fixed chamber, displacing water from the chamber by passing gas into it, and then welding by means of the conventional GMA process in the short-circuiting mode which employs a solid wire. Such a process is described in U.S. Pat. No. 3,876,852 (Topham). M. L. Levin in 'Welding in the Sea', Marine Technology, Vol 4 No. 3, June 1973 pp 73-77 also refers to using a semi-automatic MIG welding process in a gas filled chamber under water in order to make 'top quality' welds. He specifically states that the welding electrode would not have any flux. P. L. J. Leder and F. W. Lunau in a paper entitled 'High duty Welding' published in the Australian Welding Journal 18, No 5 pp. 149–159, September-October 1974 also refers to GMA welding under water, this time in a small hand-held gas-filled chamber having transparent walls.

We have surprisingly found that despite the aforementioned publications to use underwater a semi-automatic GMA (i.e. solid wire) arc welding process in a chamber containing gas this process often fails to produce sound welds, there often being lack of fusion between the weld metal and the parent metals i.e. the weld metal solidifies before adequate fusion with the parent metal has taken place.

With the objects of providing a method welding under water or at superatmospheric pressure (or both) which makes possible the deposition of weld metal having sound mechanical and metallurgical properties from a consumable welding wire and which also makes possible the attainment of adequate fusion between the weld metal and the parent metal copending application Ser. No. 758,867, Pinfold, filed Jan. 12, 1977 (Pinfold assignor to BOC Limited) provides a method of arc welding in a chamber containing a gaseous environment, including the steps of forming the gaseous environment in the chamber by passing into the chamber at least one inert gas selected from the group consisting of argon, krypton, xenon and helium and at least one oxygen-containing gas selected from the group consisting of oxygen and carbon dioxide, and depositing weld metal from a consumable, flux-cored, arc-welding wire containing at least one strong deoxidiser selected from the group consisting of magnesium, aluminium, zirconium, titanium, barium, lithium and calcium, the proportion of oxygen (if any) in the gaseous environment having a partial pressure less than the partial pressure of oxygen in air and constituting less than 14% by volume of the gaseous environment.

Although this method provides an improvement over the prior art it suffers from two disadvantages. First, it will generally require relatively large containers of gas to be shipped to the site where the weld is to be made. For under water welding, this means ensuring that the supply ship from which the under water welders operate needs to be provided with adequate supplies of the necessary gas before it leaves the shore. Second, and more importantly when welding under water the atmosphere or gaseous environment in the welding chamber will inevitably be saturated with moisture unless an elaborate chamber, in which the gaseous environment is created, is sealed from the surrounding water and provided with dehumidification apparatus. Such moisture may tend to affect the mechanical properties of the weld adversely and may also give rise to hydrogen embrittlement of the weld metal, particularly at large superatmospheric pressures.

OBJECTS OF THE INVENTION

It is an object of the invention to provide a method of welding under water which makes possible the deposition from a consumable welding wire of weld metal having sound mechanical and metallurgical properties.

It is a further object of the invention to provide a method of welding under water which makes possible the attainment of adequate fusion between the weld metal and the parent metal.

It is a yet further object of the invention to provide a method of underwater welding which employs a consumable welding electrode in a chamber holding a gaseous atmosphere so as to limit any deleterious effect moisture in the gaseous atmosphere may have on the mechanical properties of the weld.

DESCRIPTION OF THE INVENTION

According to the present invention there is provided a method of arc welding under water, including the steps of:
(a) establishing a chamber containing a gaseous atmosphere about the work to be welded;
(b) feeding a consumable flux-cored arc-welding wire to a welding torch and striking an arc between the wire and the work to be welded so as to effect transfer of molten weld metal from the wire to the work, the arc welding wire containing at least one strong deoxidiser selected from the group consisting of magnesium, aluminium, zirconium, titanium, barium, lithium, and calcium, and
(c) shielding the arc and molten weld metal by feeding to the torch a shielding gas comprising at least one inert gas selected from argon, krypton, xenon, and helium and at least one oxygen-containing gas selected from oxygen and carbon-dioxide, the shielding gas issuing from the welding torch as an annular curtain of gas around the welding wire.

The term "strong deoxidiser" is used herein to indicate a metal whose reaction with oxygen is considerably more exothermic than that between iron oxygen. For the avoidance of doubt, manganese and silicon although used extensively in welding electrodes as deoxidisers are not classified herein as "strong-deoxidisers". The following metals are classified herein as strong deoxidisers: magnesium, aluminium, zirconium, titanium, barium and lithium.

Metals such as calcium are, theoretically speaking, suitable for use as "strong deoxidisers" but tend to react so readily and so violently with oxygen or moisture that the difficulties in storing them, handling them, and manufacturing an electrode incorporating them, renders their use as "strong deoxidisers" either hazardous or inconvenient or both. For some metals, for example calcium, it has been alleged that some of the difficulties mentioned in the preceding sentence may be reduced by forming an alloy of the metal with, typically, iron.

Preferred strong deoxidisers are aluminium and magnesium.

Flux-cored welding wires containing strong deoxidisers are commercially available and may be used in the method according to the present invention. It is notable that such welding wires containing strong deoxidisers are we believe, examples of the class of welding electrodes termed "self-shielding or "in-air" welding electrodes. Although it has been proposed to use "strong deoxidisers" in flux-cored welding wires we believe that no such welding wire has hitherto been used with an externally supplied shielding gas. It may thus be said that the method according to the present invention makes use of welding wires of the 'self-shielding' or 'in-air' type with an externally-supplied shielding gas.

Preferred electrodes for use in conjunction with the method according to the present invention are sold under the registered trade mark "Innershield". Innershield 203 M and Innershield 203 Ni electrodes are particularly suitable for use in the method according to the present invention. "Self-shielding" electrodes sold under the mark "Fabshield" are also suitable. It is, however, entirely within the scope of the present invention to make up a flux-cored electrode especially for use in the method of the present invention. Such an electrode could be unsuitable for arc welding without an external shielding gas at atmospheric pressure.

By the term "inert gas" as used herein is meant a gas which does not react chemically with any constituent of the welding wire and does not adversely affect the metallurgical properties of the weld metal. The preferred inert gas is argon. Helium, may, however, be used as an inert gas in addition to, or instead of, argon. Also, one or more 'noble' gases such as krypton and xenon may if desired be used instead of or in addition to argon or helium.

If the gaseous environment acts as the shielding gas mixture it may contain just one inert gas, for example, argon or helium. Alternatively, it may include both argon and helium. Almost inevitably, unless a welding gun having its own built-in fume extractor is used, a relatively large quantity of fume will be emitted by the welding wire. It is desirable to remove this fume from the chamber so as to prevent the fume obscuring the view of the welder.

The shielding gas mixture may be fed to the arc with the welding wire as an annular stream surrounding the welding wire as it emerges from the welding gun. This practice is advantageous if the weld is to be made under sea in a chamber which is large enough to accommodate a welder. This is because it avoids the need to transport out to sea a large volume of relatively expensive inert gas so as to create the gaseous environment in the chamber. Instead, a pump may be used to extract air from the atmosphere and supply it under water to the chamber. Although a volume of inert gas will be required for the shielding gas mixture, this volume will generally be relatively small compared with the volume of air required to provide the gaseous environment in the chamber. It is possible, however, to use inert gas such as argon or helium, or a mixture thereof, as the gaseous environment.

The method according to the present invention may be used when it is desired to weld under water. In the interior of the chamber there may be controls for adjusting the supply of gas thereto and for regulating the supply of electrical power to electrically-operated apparatus, such as lighting systems, therein. In such a chamber people may work without their own independent breathing apparatus. Typically, such a chamber will have removable base or removable side wall (or portion thereof) to permit access to be gained to its interior and to permit water to be displaced therefrom. The wall of such a chamber will typically be made of relatively thick steel which is well capable of withstanding the super-atmospheric pressures to which it is likely to be subjected in use. Such chambers suffer from the disadvantage of requiring complicated support equipment on the surface of the water.

It is preferred to use a form of chamber in which the welder relies on his own breathing equipment and supply of oxygen. Such a chamber is adapted to be fitted around the workpieces to be welded together, and preferably has an open base. Gas (typically air or argon) is then supplied to the chamber to displace water from, and to create a gaseous environment in, its interior. The chamber may be large enough for a welder-driver to work with his head and shoulders (or substantially his whole body) in the gaseous environment. On the other hand the chamber may merely be sufficiently large to enable a welder-diver to insert the welding gun into the gaseous environment. If the chamber is not sufficiently large for a welder-diver to work with his head within the gaseous environment the chamber may have one or more walls of transparent material through which he can see what he is doing when he is welding.

An alternative (but one which is not preferred) is to use a portable chamber comprising a small cylinder in which a welding torch terminates. The cylinder is closed at one end, preferably by a transparent plate, and is open at the other. The open end preferably has attached to it a contoured flexible seal which is adapted to be pressed against the workpieces to be welded. The welding torch preferably enters the cylinder through a flexible gland at one side. When gas is passed into the cylinder water is displaced through the open end and gaseous environment is created within the cylinder. A welder-diver is able to manipulate the welding torch with one hand while holding the cylinder against the workpieces with the other, and to observe a weld being deposited through the transparent plate.

The method according to the present invention is also suitable for welding in a hyperbaric chamber on dry land or on the surface of the water.

The flux of the electrode preferably contains substances capable of giving a viscous slag. Typically the electrode may contain calcium flouride and a compound of strontium or barium. It is believed that these compounds, together with magnesium oxide and aluminium oxide which are formed under the conditions of the arc if the electrode contains magnesium and aluminium as strong deoxidisers, are capable of giving a viscous slag. By forming a viscous slag it is possible to weld out-of-position (e.g. in the horizontal vertical, vertical or overhead positions) with a substantially greater heat input than with a solid wire GMA welding process.

It is also preferred that the core of the electrode contain a compound, such as lithium fluoride, or a lithium oxide which under the conditions of the arc releases a metal vapour. It is believed that such metal vapour tends to shield the arc and to reduce diffusion of gas from the gaseous environment into the weld metal being deposited.

It is believed that the Innershield 203 M and Ni electrodes include in their core magnesium, aluminium, barium fluoride and a compound of lithium.

The core of the electrode may also contain if desired, metal oxides such as iron oxide. These react exothermically with strong deoxidisers such as aluminium and magnesium supplying extra heat to the weld pool. This results in fusion characteristics superior to those associated with those conventional welding processes in which a solid or flux-cored wire is used with an externally supplied shielding gas.

In addition, the core of the electrode may also contain alloying metal powder such as nickel.

If the welding wire has been formulated for use at atmospheric pressure without a shielding gas, the proportion of strong deoxidants will have been selected with the aim of avoiding two causes of weakness in the weld metal deposited by the wire. One cause of such weakness is insufficient strong deoxidant. When the level of strong deoxidant is insufficient oxygen and nitrogen will enter and become chemically combined with the weld metal. The other cause of such weakness is excessive strong deoxidant. When the level of strong deoxidant is excessive not all of it will be consumed in reacting with oxygen and nitrogen to form slag. Some will thus enter the weld metal. It has been found that the presence of excessive strong deoxidant or excessive oxygen in the weld metal can be deleterious. Formulators of 'self shielding' electrodes for use at atmospheric pressure thus try to select the proportion of strong deoxidant such that when welding it is substantially all consumed without excessive quantities of oxygen or nitrogen entering the weld metal.

What we believe is that if a welding wire which has been formulated for use in air at atmospheric pressure without a shielding gas is used in air at above atmospheric pressure there is a decline in the strength of weld metal deposited. This effect becomes increasingly pronounced as the pressure grows. There are a number of possible reasons why this should be so. One of these is that as the pressure increases more molecules of oxygen and nitrogen will tend to diffuse into the arc and may possibly cause excess contaminant gases to enter the weld metal giving rise to embrittlement. However, it would be surprising if this were the sole reason for the reduction in metallurgical properties at super-atmospheric pressure. For example, if the electrode employs a self-generated metal vapour shield this may tend to break down as the pressure increases. Moreover, increasing pressure also tends to affect the stability of the arc, and this too will lead to a poor weld.

We have found that the adverse effects of super-atmospheric pressure on the mechanical properties of the weld may be reduced by using the welding wire with a shielding gas mixture containing a selected proportion of oxygen, the proportion having been selected to complement the composition of the welding wire at the prevailing pressure. The proportion of oxygen that is preferably included would appear not to have any strict relationship with partial pressure of oxygen in air at atmospheric pressure. Conceivably, it might be expected that for the weld metal to have tolerable mechanical properties, the percentage by volume of the oxygen in the shielding gas multiplied by the pressure in the chamber should be approximately equal to the partial pressure of oxygen in air at atmospheric pressure. In this way, the number of molecules of oxygen entering the arc per unit time might be kept the same as at ambient pressure. However, this factor does not appear to be at all critical and it is found that there is quite a wide tolerance on the proportion of oxygen that may be included in the shielding gas.

For example, at 3 bars (absolute) the gas mixture may typically contain from 2 to 7% by volume of oxygen, and at 5 bars (absolute) from 1 to 4.2% by volume of oxygen. We have further found that at about 9 bars (absolute) a gas mixture containing 98% by volume of inert gas and 2% by volume of oxygen may, for example, be used. At about 15 bars (absolute) a gas mixture containing 99% by volume of inert gas and 1% by volume of oxygen may be used.

Indeed, we have found it convenient to use an annular stream of shielding gas mixture consisting of 98% by volume of argon and 2% by volume of oxygen at pressures in the order of 3 bars (absolute), as well as at about 9 bars (absolute). This gas mixture is available commercially and thus there is no need to mix the gases on site. Similarly a mixture of 99% by volume of argon and 1% by volume of oxygen is commercially available and may be used at about 15 bars.

It may seem surprising that the same gas mixture can be used to provide a moving shielding gas stream over a wide range of pressures. We believe that this is made possible by a tendency at higher pressures for the welding electrode to emit increasing volumes of hydrogen. Thus, there tends to be a requirement for more oxygen at higher pressures to oxidise the hydrogen, which requirement tends to counteract the tendency for a smaller proportion of oxygen to be needed in the gas mixture to react with the strong deoxidisers. Another significant factor is that the design of the nozzle of the welding torch will influence the rate at which gas from the chamber atmosphere is entrained in the shielding gas mixture. If the chamber atmosphere is air such entrainment will enhance the oxygen content of the shielding gas mixture, whereas if the chamber atmosphere is argon such entrainment will further dilute the oxygen in the shielding gas mixture. We have found it preferable to use a nozzle which keeps such entrainment to a minimum. Such a nozzle is made by the Tweco Company. It has a standard ⅝ of inch tapered nozzle and is designated by Type No. 24A-62SS. At pressures up to about 9 bars the nozzle may be arranged such that the contact tip terminates in the same plane as the shroud of the nozzle. At pressures above about 9 bars the contact tip is preferably set back a small distance relative to the shroud. Thus by appropriately selecting the chamber atmosphere and the welding torch a commercially-available shielding gas mixture may be used over a wide range of pressures. However, we have found it possible to use gas mixtures containing 2% of oxygen and 92% of argon (percentages are by volume) at pressures as high as 20 bars. It is also possible to use such shielding gas mixtures containing a greater proportion by volume of oxygen for example, a shielding gas mixture containing up to 6% by volume of oxygen the balance being inert gas such as argon may be used at pressures up to 20 bars.

By using the method according to the present invention we have been able to weld in an atmosphere fully saturated with water vapour at pressures up to at least 13½ bars (equivalent to a depth of water of about 400 feet). Welding under the same conditions at greater depths of water is also possible.

Since strong deoxidisers will react exothermically with oxygen-containing gas we postulate that it is possible, though not preferred, to use an oxygen-containing gas instead of some or all of the oxygen in the shielding gas mixture.

The optimum proportion to be used at any pressure, may course, be determined by simple experiment.

If desired, nitrogen may be included in the shielding gas mixture in an attempt to simulate more closely conditions which prevail when the welding wire is used in air at atmospheric pressure. However, we have found it unnecessary to do this. Moreover, if nitrogen is included in the shielding gas mixture care should be taken to prevent it from entering the weld metal. Thus we believe that if included at all it should be present in relatively small quantities and that its percentage by volume in the shielding gas multiplied by the pressure in the welding chamber should not exceed the partial pressure of nitrogen in air.

The preceding discussion of how much oxygen or oxygen-containing gas to include in the shielding gas mixture has been based on the assumption that the shielding gas mixture will be used with a commercially available welding wire. It is of course possible to formulate a welding electrode especially for use in the method according to the present invention, though this is likely to be economically disadvantageous as the potential market for the wire would be limited. Nonetheless, it might be advantageous from the point of view of obtaining good welds under water to include in the wire unusually large quantities of iron oxide and a strong deoxidiser, such as aluminium. Iron oxide and aluminium react together very exothermically to form iron and aluminium oxide. The heat generated by this reaction would facilitate fusion of the weld metal and the work and helps to counteract the tendency of thick workpieces to act as heat sinks making adequate fusion more difficult to achieve. The process is thus superior in this respect to conventional solid wire GMA welding processes. It may also be advantageous to include in the welding wire rather more arc stabiliser than is conventional so as to combat the tendency of the welding arc to become unstable at elevated pressure. Salts of alkali metals and rare earths are generally suitable as arc stabilisers.

If oxygen and oxygen-containing gas is omitted from the gas mixture at pressures above atmospheric the weld does not wet the workpieces to be welded together as well as it does when oxygen is included in the gas mixture. The improved wetting given by including oxygen in the gas mixture is of particular importance when welding under water as it reduces difficulties in removing slag from the edges of the weld between weld runs.

The invention includes within its scope pipelines and other offshore installation when welded using the method according to the present invention.

The method according to the present invention will now be described by way of example with reference to the accompanying drawing which is a schematic view of one form of apparatus suitable for performing the methods according to the present invention.

BRIEF DESCRIPTION OF DRAWING

The single FIGURE of the drawing represents a schematic view partly in section, with selected portions enlarged for clarity.

Referring to the drawing, a DC power source 2 located above water is connected in electrical circuit with the contact tip of a welding torch 24 via a lead 14 which passes under water through an umbilical tube 16. The welding circuit is completed by a lead 17 which is connected between the power source 2 and a workpiece 32 to be welded. A conventional submersible wire feed unit 6 shown schematically in FIG. 1, contains a drive motor 4, a traction element 8 and a wire spool 10. These components together with the motor are located in a water-tight casing 12. The motor 4 is connected to the power source 2 by means of lead 15 which is received by the umbilical tube 16 via suitable control circuits 13. For convenience, the electrical connections between the lead 15 and the motor 4 are not illustrated. However, suitable wiring arrangements are well known in the art. Alternatively the drive motor 4 may have its own independent power supply. The umbilical tube 16 also receives a flexible gas conduit 18 connected at one end to a gas mixer 20 which is located above water, a flexible gas conduit 70 which is connected to an above-water source 72 of compressed gas (e.g. argon), and a flexible gas conduit 74 which is connected to an above-water source 76 of compressed gas (e.g. argon). The umbilical tube 16 protects the leads and conduits therein as these leads and conduits pass into the submersible wire feed unit. The conduit 74 terminates in the casing 12 and thereby provides in the casing 12 a gas pressure just greater than the surrounding hydrostatic pressure, venting of gas being effected through a suitable demand valve (not shown) which is set so as to prevent the pressure in the casing 12 becoming excessive. From the wire feed unit 6 a continuation 25 of the umbilical tube 16 protects welding wire from the spool 10, a continuation of lead 14 and the shielding gas conduit 18 as they pass to the welding torch 24 which a welder-diver is able to insert into a welding chamber 40. The conduit 18 terminates short of the torch 24, the gas being supplied to the nozzle of the torch, the arrangement being that shielding gas therefrom issues from the nozzle of the torch, in an annular stream around the consumable welding wire.

The welding chamber 40 has a wall 42 which is of transparent material. The upper wall 44 of the chamber has a contoured flexible seal 30 attached to it, while the bottom of the chamber is open to the sea. The flexible conduit 70 continues from the casing 12 and enters the chamber 40 through the upper wall 44 thereof so as to conduct into the chamber gas from the conduit 70.

The gas mixer 20 has two conduits 84 and 86 which are both joined to the shielding gas conduit 18. The other ends of the conduits 84 and 86 terminate in a source 22 of oxygen gas and a source 23 of argon gas respectively. The sources 22 and 23 are conventiently cylinders of compressed gas. Associated with the gas sources 22 and 23 are pressure regulators 50 and 52 respectively. In the conduits 84 and 86, downstream of the pressure regulators 50 and 52, are control valves 54 and 56 respectively. Associated with the control valves 54 and 56 are flowmeters 58 and 60 respectively. By observing the flow rate of gas through the flow meters 58 and 60 the valves 54 and 56 may be preset to give any desired mixture of oxygen and argon.

Alternatively a cylinder containing a mixture of argon and oxygen in chosen proportions may be used instead of the gas mixer.

In operation, the chamber 40 is held against the workpiece 32 by its shape, e.g. annular, or by holding devices such as clamps, and the workpiece is connected directly to the power source 2. The wire feed unit 6 is positioned under water as close as possible to the region where the weld metal is to be deposited. The power source 2 itself, together with the sources of gas and the mixer 20 and also the control unit 13 for controlling welding parameters, is located above the surface of the water. The power supply 2 and the wire feed unit 12 are energised and the supply of gases from sources 22 and 23 and argon from the sources 72 and 76 is commenced when the welder-diver is ready. The argon passing into the chamber 40 displaces sea water from within the chamber through the bottom thereof. The welder-diver inserts his torch 24 into the localised 'dry' or gaseous environment thus provided. The gas mixture from the mixer 20 provides for the welding wire (preferably "Innershield" welding wire) (Innershield is a Registered Trade Mark) a shielding gas containing a controllable proportion of oxygen.

An arc is struck between the tip of the consumable welding wire and the workpiece, and molten metal is transferred from the electrode to the workpiece in the globular mode.

The chamber 40 preferably has a conduit 46 extending from within the chamber 40 through the wall 42 and terminating above the wall 42. In the region outside the chamber 40 the conduit 40 has a manually-operable control valve 48 which may be set to give a steady flow of gas out of the chamber 40. The gas may be supplied to the chamber 40 at a corresponding rate throughout a welding operation. This provides for a continuous flow of gas through the chamber to expel the fume evolved when welding.

It is desirable that the gaseous environment in the chamber should contain less oxygen than would create a fire or explosion hazard at the prevailing pressure. In general, the maximum concentration of oxygen tolerable in the gaseous environment is 14% by volume of oxygen, but as relatively high pressures this concentration will be reduced. By supplying a shielding gas mixture containing 98% by volume of argon and 2% by volume of oxygen at all depths down to 600 feet when welding in a chamber having an argon 'atmosphere', the results shown in Tables 1 and 2 have been obtained with a Lincoln Innershield 203M flux-cored welding wire.

The tests were made in accordance with the procedure specified in BS 639. It should be noted that the weld metal was not heat treated for hydrogen removal as may be performed within BS 639.

TABLE 1

| Depth of Water | | Yield Stress | | Ultimate Tensile Strength | | Elongation | Reduction of area | Weld Metal Hardness |
|---|---|---|---|---|---|---|---|---|
| Feet | Meters | Tn/In$^2$ | N/mm$^2$ | Tn/In$^2$ | N/mm$^2$ | % | % | VPN (LONG Load) |
| 0 | 0 | 33.7 | 520 | 38.0 | 586 | 29 | 72 | 209 − 183 / 186 |
| 66 | 20.1 | 32.3 | 506 | 38.9 | 600 | 27 | 66 | 191−227 / 209 |
| 120 | 36.6 | 32.8 | 506 | 38.6 | 595 | 25 | 45 | 196 − 233 / 214 |
| 230 | 76.3 | 37.2 | 574 | 41.9 | 647 | 21.4 | 58.3 | 215 − 264 / 234 |
| 450 | 137 | 35 | 540 | 39.5 | 610 | 22 | 61 | 221 − 258 / 239 |

TABLE 2

| Depth of Water | | Charpy Impact Strength | | | | | | | | |
|---|---|---|---|---|---|---|---|---|---|---|
| | | 60° C. | | 30° C. | | 0° C. | | 30° C. | | −00° C. | |
| Feet | Meters | Ft-lbs | J | Ft-lbs | J | Ft-lbs | J | Ft-lbs | J | Ft-lbs | J |
| 0 | 0 | 132 | 180 | 121 | 165 | 96 | 130 | 66 | 90 | 37 | 50 |
| 06 | 20.1 | 155 | 210 | 151 | 205 | 121 | 165 | 97 | 132 | 52 | 71 |
| 120 | 36.6 | 162 | 219 | 149 | 202 | 129 | 175 | 85 | 116 | 50 | 68 |

TABLE 2-continued

| Depth of Water | | Charpy Impact Strength | | | | | | | | |
|---|---|---|---|---|---|---|---|---|---|---|
| | | 60° C. | | 30° C. | | 0° C. | | 30° C. | | −00° C. |
| Feet | Meters | Ft-lbs | J | Ft-lbs | J | Ft-lbs | J | Ft-lbs | J | Ft-lbs | J |
| 250 | 76.3 | 140 | 190 | 111 | 151 | 74 | 101 | 55 | 75 | 30 | 41 |
| 450 | 137 | 144 | 195 | 133 | 180 | 108 | 145 | 72 | 100 | 43 | 60 |

We claim:

1. A method of arc welding under superatmospheric conditions under water at a depth sufficient to affect arc stability including the steps of:
   (a) establishing a chamber containing a gaseous atmosphere about the work to be welded;
   (b) feeding a consumable self-shielding flux-cored arc-welding wire to a welding torch and striking an arc between the wire and work to be welded so as to effect transfer of molten weld metal from the wire to the work, the arc welding wire containing at least one strong deoxidiser selected from the group consisting of magnesium, aluminium, zirconium, titanium, barium lithium and calcium; and
   (c) shielding the welding and molten weld metal arc by feeding to the welding torch a stream of shielding gas comprising at least one inert gas selected from argon, krypton, xenon and helium, and at least one oxygen-containing gas selected from oxygen and carbon dioxide, the shielding gas issuing from the welding torch as an annular curtain of gas around the welding wire as it emerges from the welding torch.

2. A method according to claim 1 in which the gaseous atmosphere inside the chamber comprises air.

3. A method according to claim 1 in which the gaseous atmosphere inside the chamber comprises at least one inert gas selected from argon, helium, krypton and xenon.

4. A method according to claim 1 in which the shielding gas mixture contains oxygen but no oxygen-containing gas, and in which the percentage by volume of oxygen in the shielding gas mixture multiplied by the pressure in the chamber does not exceed the partial pressure of oxygen in air at atmospheric pressure.

5. A method according to claim 4 in which the pressure in the chamber is up to 3 bars, and in which the shielding gas mixture contains from 2 to 7% by volume of oxygen.

6. A method according to claim 4 in which the pressure in the chamber is in the range of 3 to 9 bars and the shielding gas mixture contains from 1 to 4.2% by volume of oxygen.

7. A method as claimed in claim 1 in which carbon dioxide is present in the shielding gas and in which the percentage by volume of oxygen in the shielding gas mixture multiplied by the pressure in the chamber added to the percentage by volume or carbon dioxide multiplied by half the pressure in the chamber is less than the partial pressure of oxygen in air at atmospheric pressure.

8. A method as claimed in claim 1 in which the core of the welding wire includes calcium flouride.

9. A method as claimed in claim 1 in which the core of the welding wire includes a compound of barium.

10. A method according to claim 9, in which the compound of barium is barium flouride.

11. A method according to claim 1, in which the core includes a compound of lithium.

12. A method according to claim 11 in which the compound of lithium is selected from lithium flouride and lithium oxide.

13. A method according to claim 1, in which the core includes iron oxide.

14. A method according to claim 1, in which the welding torch has nozzle means for causing the shielding gas to issue from the torch without entraining gas from the chamber atmosphere.

* * * * *